United States Patent
Bernstein

Patent Number: 6,109,749
Date of Patent: *Aug. 29, 2000

[54] SOFT BIFOCAL CONTACT LENSES

[76] Inventor: Paul R. Bernstein, 36 Long Meadow Rd., Riverside, Conn. 06878

[*] Notice: This patent issued on a continued prosecution application filed under 37 CFR 1.53(d), and is subject to the twenty year patent term provisions of 35 U.S.C. 154(a)(2).

[21] Appl. No.: 08/963,981

[22] Filed: Nov. 4, 1997

[51] Int. Cl.$^7$ ...................................................... G02C 7/04
[52] U.S. Cl. .............................................................. 351/161
[58] Field of Search .......................... 351/160 R, 160 H, 351/161, 162

[56] References Cited

U.S. PATENT DOCUMENTS

| | | | |
|---|---|---|---|
| 3,973,837 | 8/1976 | Page | 351/161 |
| 3,973,838 | 8/1976 | Page | 351/161 |
| 4,573,775 | 3/1986 | Bayshore | 351/161 |
| 4,618,229 | 10/1986 | Jacobstein et al. | 351/161 |

Primary Examiner—Scott J. Sugarman
Attorney, Agent, or Firm—Kilgannon & Steidl

[57] ABSTRACT

Briefly, and in its broadest aspect, the contact lens of the invention comprises a soft hydrophilic contact lens providing a distance and near prescription; said lens having an integrally formed bevel that provides a mechanism for translating the lens over the eyeball. Also, the bevel does not form a part of the optical portion of the lens.

13 Claims, 4 Drawing Sheets

SOFT BIFOCAL CONTACT LENSES

BACKGROUND OF THE INVENTION

1. Field of the Invention

The present invention relates to contact lenses, and more particularly to a bifocal lens having a soft plastic material in contact with the eye.

2. Description of the Prior Art

Persons suffering from presbyopia require bifocal type lenses to enable them to focus on both distant and near objects. Such lenses require areas having two different powers and correction. Bifocal lenses are known for both conventional glasses, and for contact lenses that are inserted directly onto the eye. A common bifocal contact lens is of the alternating vision type in which the distance power portion is ground to permit the target to be viewed when looking straight ahead. For closeup viewing, the lens must move over the surface of the eye to place the closeup power portion directly over the pupil, with the distance power portion then out of the line of sight.

It is, therefore, common to form the lens from a rigid plastic material, such that the lower edge of the lens contacts the lower eyelid when the eye is in down gaze, causing the lens to move upward. Gravity and the upper eyelid return the lens to the distance position when the eye is in primary gaze. It has been found that many persons have difficulty with a lack of comfort of hard plastic lenses, and prefer those of soft materials. Soft plastic translating bifocal lenses of the prior art have met with limited success. In the instance where the soft plastic bifocal lens of the prior art did not have a lower portion that extended under the lower eyelid when positioned on the patient, translation of the lens beneath the lower eyelid resulted in irritation and consequent discomfort to the patient. In the instance where the soft plastic bifocal lens of the prior art was disposed beneath the lower eyelid, rotation of the eyeball to a down gaze for closeup viewing did not produce sufficient stability of the lens and the lower eyelid so as to properly position the pupil relative to the near correction portion of the lens.

Typical prior art patents of bifocal contact lenses include U.S. Pat. Nos. 4,874,234; 4,618,229; 3,597,055; 3,560,598; and 3,440,306, and Japanese Patent No. 63-95,415.

U.S. Pat. No. 5,071,244 describes a soft hydrophilic contact lens having its central portion formed to the distance correction prescription of the user. A small auxiliary lens is formed to the near vision prescription of the user, said auxiliary lens being cemented along a lower margin of the main lens. Further, the auxiliary lens protrudes slightly from the surface of the main lens, the main lens being formed to fit over the eye of the user with the central portion centered over the pupil. Thus, the near vision lens will normally be below the line of sight of the wearer.

When the wearer looks downward for reading or the like, the tapered margin of the carrier may tend to move beneath the lower eyelid. When the lower eyelid contacts the protruding auxiliary lens, the carrier is translated superiorly or vertically, placing the auxiliary lens over the pupil, and the line of sight of the user then passes through the near vision lens portion.

When the user returns the eye to a primary gaze, the lens will translate downward, or inferiorly, by gravity, and the action of the upper lid, to move the distance correction portion of the lens back over the pupil.

In the lens of U.S. Pat. No. 5,071,244 ('244), the auxiliary lens 12, which is used to translate the lens over the eyeball during the conversion from distance correction to near correction, has a limitation to its thickness which is a reflection of the diopter value needed to correct the near vision problem. Further in the '244 patent, the placement of the translation bead 12 of the lens for near vision correction dictates a significant degree of translation of the contact lens in order to align the pupil and the near vision correction portion of the overall lens. The lens 10 of the '244 patent is of uniform thickness at its edges 14. As a consequence, the balanced thickness of the top and bottom edges of the prior art lens, works against the lens returning from its position on the eyeball at the near vision correction mode to its position on the eyeball during the distance vision correction mode.

A contact lens having a fixed position on the eyeball is described in U.S. Pat. No. 4,614,413.

The lens of the subject invention: (1) minimizes the translation distance in going from the distance vision correction mode to the near vision correction mode; (2) is not dependent on the near vision correction parameter of the user in determining the size of the protrusion from the lens surface that is the translating portion of the lens and (3) has greater stability, i.e., will more easily return to the distance vision correction position on the eyeball than the prior art bifocal contact lens.

SUMMARY OF THE INVENTION

Briefly, and in its broadest aspect, the contact lens of the invention comprises a soft hydrophilic contact lens providing a distance and near prescription; said lens having an integrally formed bevel that provides a mechanism for translating the lens over the eyeball. Also, the bevel does not form a part of the optical portion of the lens.

In a preferred form of the invention, the geometric center of the lens is offset from the optical center of that portion of the lens comprising the distance prescription, the near prescription and the bevel zones. By so constructing the lens, the translation of the lens, when the user moves from distance to near viewing, is minimized. In a more preferred embodiment, the lower edge of the distance portion of the lens is disposed at the top edge of the near vision portion of the lens.

DETAILED DESCRIPTION OF THE INVENTION

Figure 1:
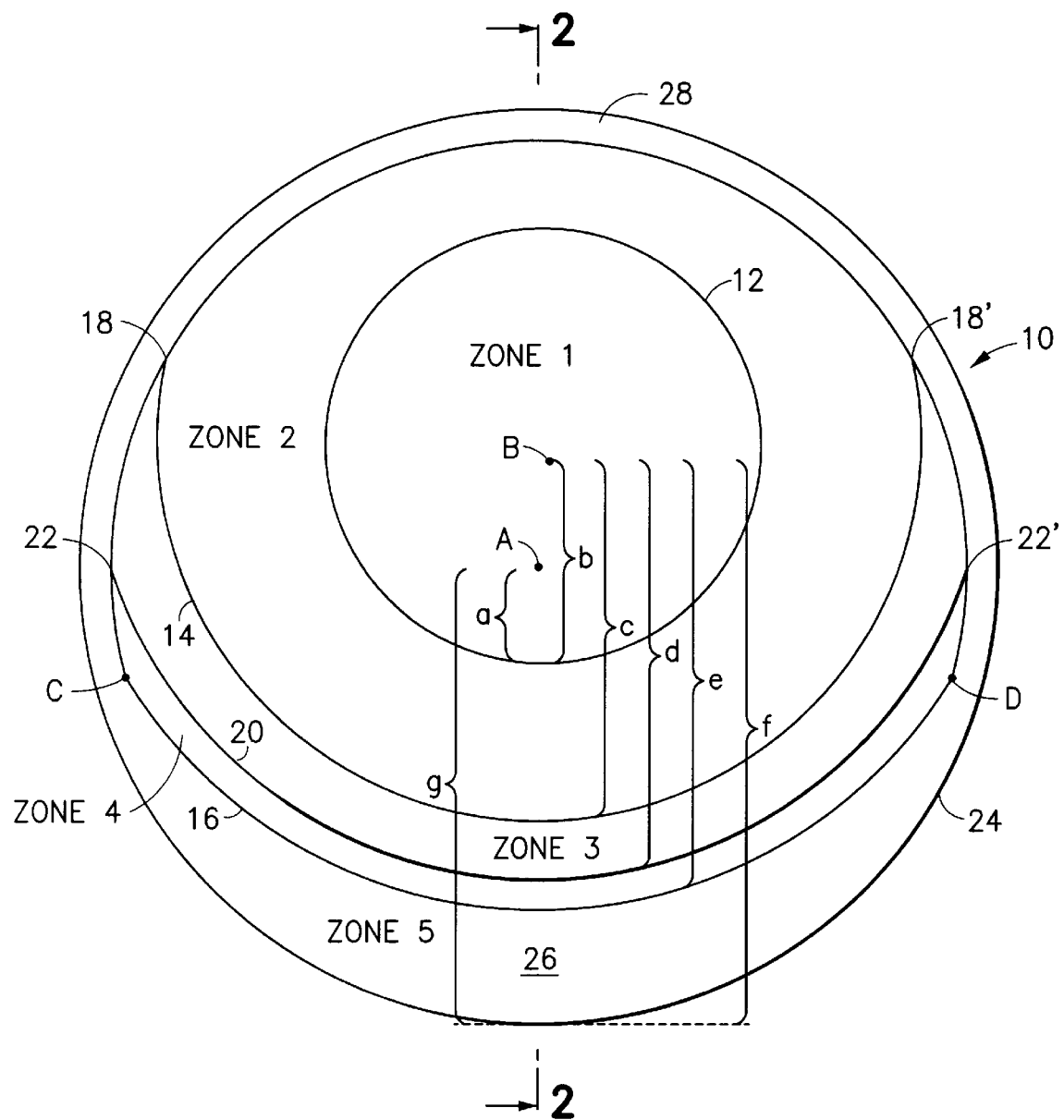
FIG. 1 is a front view of the soft hydrophilic lens in accordance with this invention.

The bifocal soft lens of the invention may be made in various sizes to custom fit to a particular patient. For purposes of disclosure, a typical design of the bifocal soft lens is shown in FIG. 1. The lens, general designated as 10, has a plurality of Zones. Zone 1 is a circular portion 12 that is prescription contoured for the distance viewing of the user. Surrounding Zone 1 is an arcuate Zone 2 bounded by the periphery 14, the upper portion of arcuate Zone 2 terminating in the outer periphery 16 of Zone 4 at the points 18 and 18. Contiguous to the outer periphery 14 of Zone 2 is arcuate Zone 3, which Zone 3 has an outer periphery 20, which terminates, as does Zone 2, in the outer periphery of Zone 4 at the points 22 and 22. Contiguous to Zone 3 and radially outward of Zone 3 is Zone 4. Surrounding zone 4 is Zone 5, which Zone 5 has a circumferential boundary 24. The lower portion 26 of Zone 5 is more spaced from the periphery of Zone 4 than the upper portion 28 of Zone 5.

Point B in Zone 1 is the geometrical center of Zones 1–4, that is, a circle proscribed from Point A of Zone 1 along the line C-D of Zone 4 would have Point B as the geometrical center. Point A of Zone 1 is the geometrical center of the lens 10.

For the lens described in FIG. 1, Zone 1 is the distance prescription portion of the lens; Zone 2 is the near prescription portion of the lens; Zones 3 and 4 are the translation bevel 30 (best shown in FIG. 2) and Zone 5 is the carrier portion, the carrier portion remaining beneath the upper and lower eyelids at all times.

With the construction of the lens of FIG. 1, the extension of the bevel out to Points C and D will accommodate a rotational turn of the lens for some 15°–20° and still function as a distance and near corrective lens.

It has been found that the lens of this invention will function effectively where the measurements of the distances (a)–(g) are as follows:

a=1.375 mm
b=3.375 mm
c=6.0 mm
d=7.0 mm
e=7.55 mm
f=9.25 mm
g=7.25 mm

While the aforedescribed lens shown in FIG. 1 has a carrier portion that extends beneath the upper and lower eyelids, it is within the scope of this invention and conceivable that, with certain patients, the carrier portion of the lens disposed on the eyeball for distance viewing will not be beneath either or both of the upper and lower eyelids.

The soft contact lens of this invention generally utilizes a plastic selected from four groups: low water nonionic polymers; high water nonionic polymers; low water ionic polymers; and high water ionic polymers.

The preferred polymer is Methofil Con A, which is the trade name for the polymer 2-hydroxyethyl methacrylate and methacrylic acid, containing miscellaneous diesters, initiators and coloring agents. Said composition has a 2-hydroxy ethyl methacrylate (2-HEMA) weight percent of 95–98 and a methacrylic acid weight percent of 0.5 to 2.5. The miscellaneous materials have a weight percent from 0.1 to 2. Some physical properties of the preferred polymer for fabricating the lens are water content equaling 55%–59%, expansion equaling 1.35 to 1.36 and a refractive index equaling 1.41 (hydrated).

Figure 2:
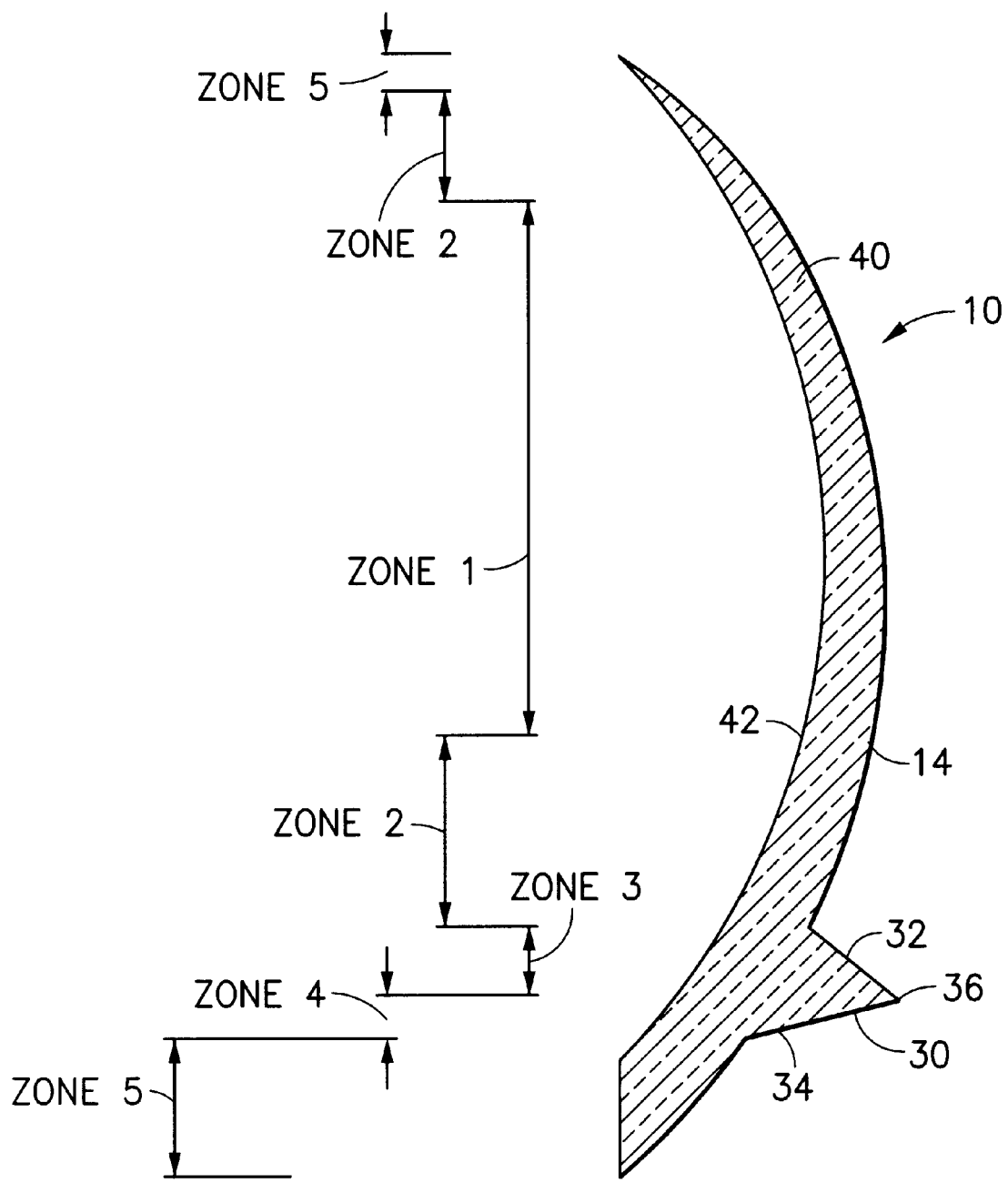
FIG. 2 is a cross-sectional view through the line 2—2 of FIG. 1.
Figure 3:
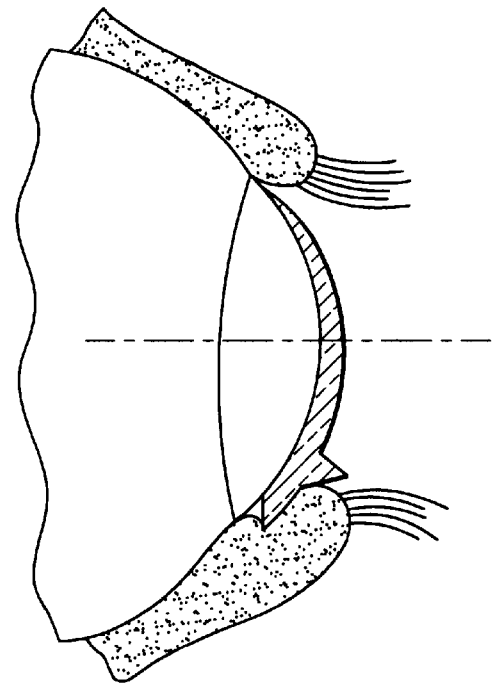
FIG. 3 is a partial sectional view of an eye with a lens of the invention positioned for distance viewing.
Figure 4:
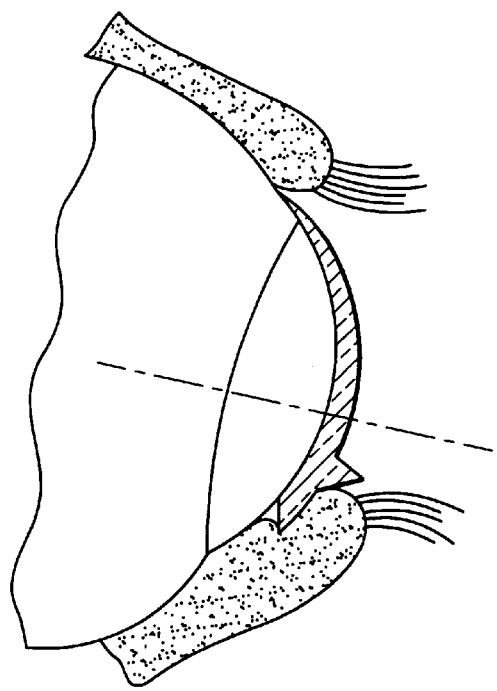
FIG. 4 is a partial sectional view of an eye with a lens of this invention positioned for closeup viewing.

As best shown in FIG. 2, the bevel designated as 30 has an upper portion 32 and a lower portion 34 which originate at the inner terminus of Zone 3 and the outer terminus of Zone 4 and converge at point 36. It has been found that disposing point 36 a distance of 0.75 mm from the interface of Zones 2 and 3 will provide a satisfactory bevel to facilitate the translation of the lens during downward movement of the eyeball to the near vision portion.

Also note in FIG. 2, that the upper portion 40 of the lens 10 is thinner in cross-section than the lower portion 42 of the lens. This difference in thickness provides a lens ballast which operates to assist the return of the lens from the near vision correction position to the distance vision correction position on the eyeball.

Figure 5:
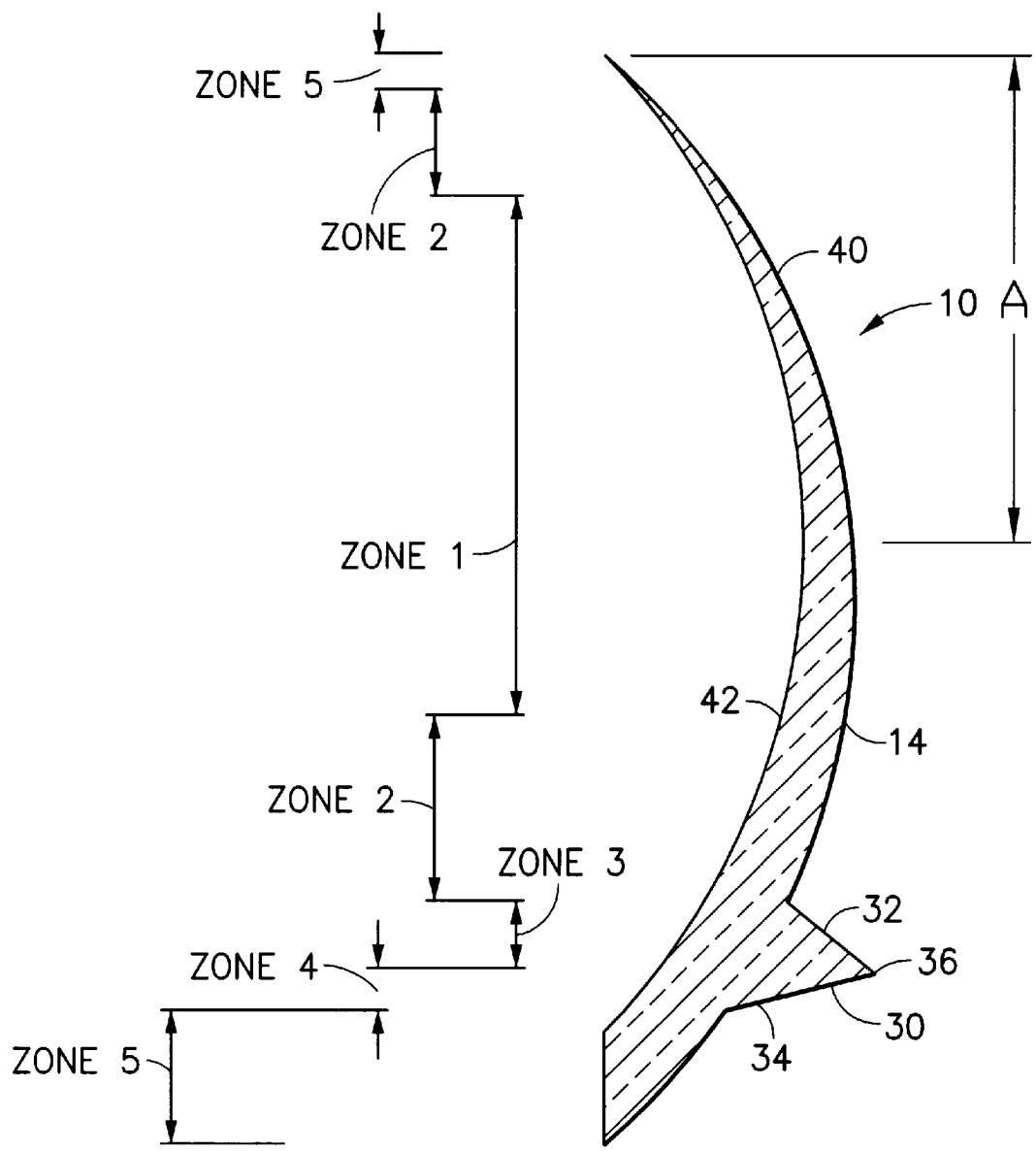
FIG. 5 is a cross-sectional view of a further embodiment of the lens of the invention.

In a most preferred form of this invention, and as best shown in FIG. 5, the upper portion 40 of the lens 10 that is disposed beneath the upper eyelid may be further reduced in thickness as shown in the area A, to facilitate the translation superiorly of the lens 10. Such thinning also adds to the stabilization of the lens on the eyeball by increasing the weight proportion of the bottom of the lens to the top of the lens, thereby facilitating the translation inferiorly of the lens when moving from the near vision correction to the distance vision correction.

Although specific examples of the invention have been shown for purposes of disclosure, it is to be understood that various modifications can be made therefrom without departing from the spirit and scope of the invention.

I claim:

1. A soft bifocal contact lens comprising a generally concave-convex, lens of soft plastic material shaped and dimensioned to an eye of a user;
   a portion of said lens formed to provide a distance vision correction for the eye of the user;
   a portion of said lens disposed beneath the central portion of said lens formed to provide a near vision correction for the eye of the user; and
   a bevel portion of the lens protruding outwardly from the convex side of the lens, said bevel portion having an upper and lower shoulder which converge to form an extended bevel of a length that precludes the bevel from passing beneath the upper or lower eyelid of the user while the eyeball translates downwardly to dispose the pupil in a proper visional relationship with the near correction portion of the lens, said bevel being disposed beneath the portion of the lens providing the near vision correction.

2. The soft bifocal contact lens of claim 1, and further wherein said lens has a lower portion disposed beneath the bevel portion, which lower portion, at least in part, is disposed beneath the user's lower eyelid when the lens is properly placed on the user's eyeball.

3. The soft bifocal contact lens of claim 1, and further wherein the portion of the lens providing the near vision correction is contiguous to the central portion of the lens.

4. The soft bifocal contact lens of claim 2, and further wherein the bevel portion of the lens is contiguous to the portion of the lens providing the near vision correction.

5. The soft bifocal contact lens of claim 2, and further wherein the portion of the lens providing the near vision correction is contiguous to the central portion of the lens and the bevel portion of the lens is contiguous to the portion of the lens providing the near vision correction.

6. The soft bifocal contact lens of claim 2, and further comprising a lens wherein the periphery of the lens is circular, the portion of the lens formed to provide a distance vision correction has a geometric center disposed radially of the geometric center of the lens and the portion of the lens providing the near vision correction is disposed contiguous to the portion of the lens formed to provide a distance vision correction.

7. The soft bifocal contact lens of claim 6 and further comprising having the bevel portion of the lens contiguous to the portion of the lens formed to provide the near vision correction.

8. The soft bifocal contact lens of anyone of claims 2–7 and 1, further wherein the weight of the upper portion of the lens is substantially less than the weight of the lower portion of the lens, so as to provide a lens ballast that assists the translation inferiorly of the lens when the user's eye is returned to a distance viewing position.

9. A soft bifocal contact lens comprising:
(a) a lens having a circular distance correction zone disposed within and distanced from the periphery of the lens, said distance correction zone having a geometric center displaced from the geometric center of the lens,
(b) said lens further having a near vision correction zone surrounding the distance correction zone, and
(c) a bevel zone disposed radially outward of the near vision correction zone and protruding outwardly from the convex side of the lens, said bevel portion having an upper and lower shoulder which converge to form an extended bevel of a length that precludes the bevel from passing beneath the upper or lower eyelid of the user while the eyeball translates downwardly to dispose the pupil in a proper visional relationship with the near correction portion of the lens, said bevel being disposed beneath the portion of the lens providing the near vision correction.

10. The soft bifocal contact lens of claim 9, and further wherein the bevel zone is contiguous to the near vision correction zone.

11. The soft bifocal contact lens of claim 9, and further wherein the bevel zone extends laterally about the near vision correction zone through a substantial portion of the lower periphery of the near vision correction zone.

12. The soft bifocal contact lens of claim 11, and further wherein the bevel zone is contiguous to the near vision correction zone.

13. The soft bifocal contact lens of anyone of claims 10–12 and 9, further wherein the weight of the upper portion of the lens is substantially less than the weight of the lower portion of the lens, so as to provide a lens ballast that assists the translation inferiorly of the lens when the user's eye is returned to a distance viewing position.

* * * * *